United States Patent
Reineke et al.

(10) Patent No.: US 11,579,943 B2
(45) Date of Patent: Feb. 14, 2023

(54) METHOD AND SYSTEM FOR PREDICTING RESOURCE REALLOCATION IN A POWER ZONE GROUP

(71) Applicant: EMC IP Holding Company LLC, Hopkinton, MA (US)

(72) Inventors: Nicole Reineke, Northborough, MA (US); James Robert King, Norwood, MA (US); Robert Anthony Lincourt, Jr., Franklin, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 304 days.

(21) Appl. No.: 16/713,347

(22) Filed: Dec. 13, 2019

(65) Prior Publication Data

US 2021/0182122 A1     Jun. 17, 2021

(51) Int. Cl.
 *G06F 9/46*       (2006.01)
 *G06F 9/50*       (2006.01)
(52) U.S. Cl.
 CPC .... *G06F 9/5094* (2013.01); *G06F 2209/5015* (2013.01)
(58) Field of Classification Search
 None
 See application file for complete search history.

(56) References Cited

U.S. PATENT DOCUMENTS

| | | | | |
|---|---|---|---|---|
| 2007/0094023 A1* | 4/2007 | Gallino | ................ | G10L 15/04 704/251 |
| 2011/0022882 A1* | 1/2011 | Jaehde | ................ | G06F 11/2035 714/E11.073 |
| 2017/0220092 A1* | 8/2017 | Kodama | ................ | G06F 1/3234 |

\* cited by examiner

*Primary Examiner* — Bing Zhao
(74) *Attorney, Agent, or Firm* — Chamberlain, Hrdlicka, White, Williams & Aughtry (57) ABSTRACT

A method for managing data includes obtaining, by a first data node, a notification, wherein the first data node is associated with a first power zone group (PZG), and in response to the notification: selecting a second data node, wherein the second data node is not associated with the first PZG, sending a data processing request to the second data node, obtaining a response based on the data processing request, wherein the response specifies a confirmation by the second data node to service the data processing request, storing a ledger entry in a ledger service that indicates the confirmation, and initiating a data transfer based on the data processing request, wherein the first data node is associated with the PZG based on a primary power source of the first data node.

20 Claims, 7 Drawing Sheets

METHOD AND SYSTEM FOR PREDICTING RESOURCE REALLOCATION IN A POWER ZONE GROUP

BACKGROUND

Systems may include multiple computing devices that may communicate with each other to transfer data. The computing devices may be powered by, primary and/or secondary power sources. The primary power sources may not always be reliable.

SUMMARY

In general, in one embodiment, the invention relates to a method for managing data. The method includes obtaining, by a first data node, a notification, wherein the first data node is associated with a first power zone group (PZG), and in response to the notification: selecting a second data node, wherein the second data node is not associated with the first PZG, sending a data processing request to the second data node, obtaining a response based on the data processing request, wherein the response specifies a confirmation by the second data node to service the data, processing request, storing a ledger entry in a ledger service that indicates the confirmation, and initiating a data transfer based on the data processing request, wherein the first data node is associated with the PZG based on a primary power source of the first data node.

In general, in one aspect, the invention relates to a non-transitory computer readable medium that includes computer readable program code, which when executed by a computer processor enables the computer processor to perform a method. The method includes obtaining, by a first data node, a notification, wherein the first data node is associated with a first power zone group (PZG), and in response to the notification: selecting a second data node, wherein the second data node is not associated with the first PZG, sending a data processing request to the second data node, obtaining a response based on the data processing request, wherein the response specifies a confirmation by the second data node to service the data processing request, storing a ledger entry in a ledger service that indicates the confirmation, and initiating a data transfer based on the data processing request, wherein the first data node is associated with the PZG based on a primary power source of the first data node.

In general, in one aspect, the invention relates to a system that includes a first data node, a second data node, and a ledger service, wherein the first data node is programmed to obtain a notification, wherein the first data node is associated with a first power zone group (PZG), and in response to the notification: select the second data node, wherein the second data node is not associated with the first PZG, send a data processing request to the second data node, obtain a response based on the data processing request, wherein the response specifies a confirmation by the second data node to service the data processing request, store a ledger entry in the ledger service that indicates the confirmation, and initiate a data transfer based on the data processing request, wherein the first data node is associated with the PZG based on a primary power source of the first data node.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing data nodes. Specifically, embodiments of the invention relate to a system that identifies power zone groups (PZGs) associated with each data node in a system and utilizes a ledger service that tracks agreements between at least two data nodes in different PZGs to transfer, store, and make available any transferred data.

Figure 1:
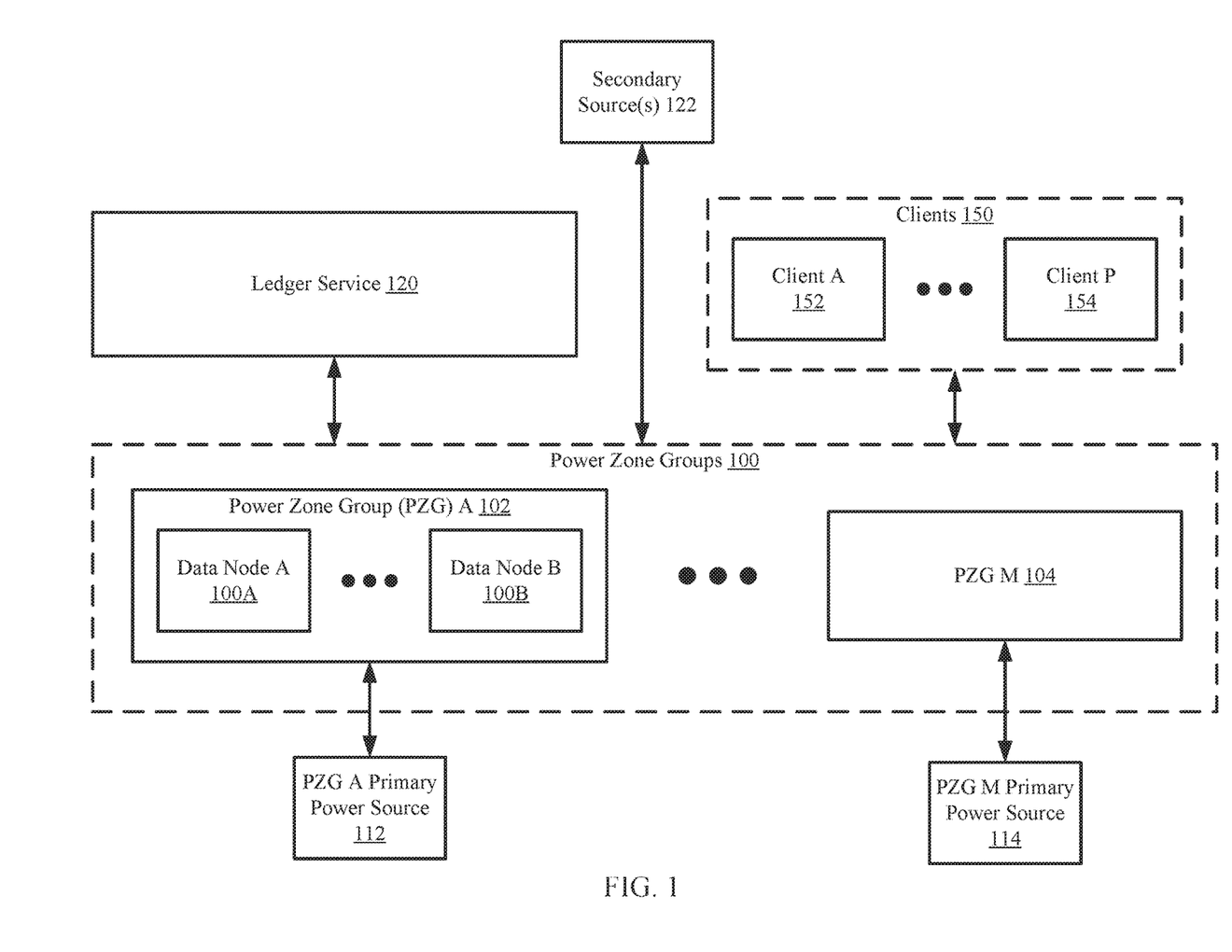
FIG. 1 shows a diagram of a system in accordance with one or more embodiments of the invention.

FIG. 1 shows a diagram of a system in accordance with one or more embodiments of the invention. The system includes one or more power zone groups (PZGs) (100), a ledger service (120), a resource use manager (140), a secondary source(s) (122), and one or more clients (150). Each component of the system may be operably connected via any combination of wired and/or wireless connections. The system may include additional, fewer, and/or different components without departing from the invention. Each component of the system illustrated in FIG. 1 is discussed below.

In one or more embodiments of the invention, the PZGs (100) are a logical grouping of data nodes (100A, 100B). In one or more embodiments of the invention, the PZGs (102, 104) are grouped based on a primary power source (e.g., 112, 114) associated with each data node (100A, 100B). In other words, each data node (e.g., 100A, 100B) in a PZG (e.g., 102) is powered by the same primary power source(s) (e.g., 112).

In one or more embodiments of the invention, the primary: power source(s) (112, 114) may provide power (which may be alternating current (AC) or direct current (DC) power) to the data nodes in the PZGs (100). The primary power sources (112, 114) may include functionality for powering the data nodes (100A, 100B) in a PZG (102, 104) for extended periods of time.

In one or more embodiments of the invention, the primary power source (112, 114) is a physical device. The physical device may be a device that stores power and provide power to other components via wired and/or wireless connections. The physical device may be, for example, a battery, a power plant connected to the host computing device via a power outlet, and/or any other types of power source without departing from the invention.

Figure 5:
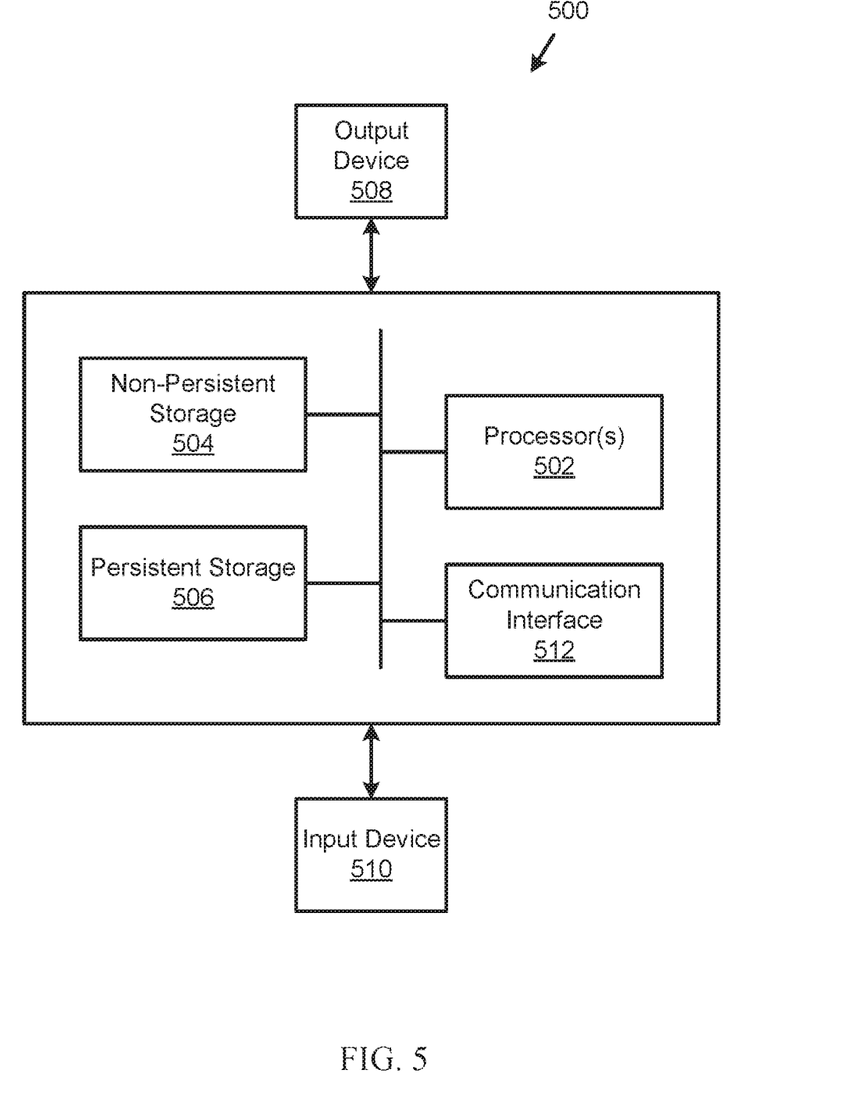
FIG. 5 shows a diagram of a computing device in accordance with one or more embodiments of the invention.

In one or more embodiments of the invention, each data node (100A, 100B) is implemented as a computing device (see, e.g., FIG. 5). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data node (100A, 100B) described throughout this application and/or all, or portion, of the method illustrated in FIG. 3A. For additional details regarding a data node (100A, 100B), see, e.g., FIG. 2.

In one or more embodiments of the invention, a ledger service (120) is a service that stores immutable entries, where each entry specifies an agreement between two data nodes and, optionally, an indication about whether the agreement was fulfilled. The agreement between the two data nodes may specify, that a first data node will store data from a second data node. Further, after the data is successfully transferred from the first node to the second node, the ledger service may also indicate that the agreement was fulfilled. The agreement between the two data nodes and the indication of whether the agreement was fulfilled may be stored in the same ledger entry or in separate ledger entries. The ledger entries in the ledger service (120) may be referenced and/or otherwise accessed by one or both of the two data nodes involved in the agreement. See e.g., FIGS. 3A and 3B for additional details regarding the operation of the ledger service.

In one or more embodiments of the invention, the ledger service (120) is implemented as a computing device (see, e.g., FIG. 5). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the ledger service (120) described throughout this application.

In one or more embodiments of the invention, the ledger service (120) is implemented as a logical device. The logical device may utilize data node resources of any number of physical computing devices to provide the functionality of the ledger service (120) described throughout this application.

In one or more embodiments of the invention, the ledger service (120) is implemented as a distributed ledger (e.g., a block chain). The distributed ledger may utilize computing device resources of any number of physical computing devices (see e.g., FIG. 5) to provide the functionality of the ledger service (120) described throughout this application.

In one or more embodiments of the invention, the secondary sources (122) provide data and/or other information associated with the PZGs, nearby-by data nodes (100A, 100B), and/or other relevant information without departing from the invention. The data and/or information may be provided to the ledger service (120) or directly to each data node (100A, 100B) to use for obtaining information regarding the PZGs of each data node (100A, 100B). For example, the primary power source (e.g., 112) of a first data node (e.g., 100A) may be specified to the data node (100A) by a secondary source.

In one or more embodiments of the invention, the secondary sources (122) specify data nodes that are located in the same geographic region. This information may be accessed by the data nodes (100A, 100B) during a power failure or potential power failure to identify any available near-by data nodes that may service any data processing of the data nodes experiencing the power failure/potential power failure.

In one or more embodiments of the invention, the secondary sources (122) may initially obtain the information from a user of the secondary sources (122). For example, a user operating on the secondary sources (122) may manually input the primary power sources (e.g., 112, 114) of the data nodes (100A, 100B) to the secondary sources (122).

In one or more embodiments of the invention, the information specified in the secondary sources (122) is obtained by monitoring the transmission of power to the data nodes (100A, 100B) to identify the primary power sources (112, 114) that power each data node in the PZGs. The secondary sources may perform this via any known or later discovered power tracing mechanisms.

For example, though not shown in FIG. 1, the secondary sources (122) may communicate with a primary power source (e.g., 112) to obtain information about the data nodes (e.g., 100A, 100B) utilizing the primary power source (112) for power. In this manner, the secondary sources (122) are made aware of the PZGs of each data node in the system.

Further, the secondary sources (122) may obtain geographical locations associated with each data node (100A, 100B) from the data nodes (100A, 100B) (or from other secondary sources) and store the monitored locations in the secondary sources (122). The locations may be identified using, for example, global positioning system (GPS), and/or any other known or later discovered mechanisms for identifying geographical locations without departing from the invention.

In one or more embodiments of the invention, the information stored in the secondary sources (122) may be obtained by the secondary sources (122) via any combination of user input and/or monitoring as discussed above.

In one or more embodiments of the invention, the clients (50) may utilize computing resources of the data nodes (100A, 100B). The clients (150) may utilize applications and/or other software executing on the data nodes (100A, 100B) to perform data processing and/or data storage. The clients (150) may utilize the data nodes (100A, 100B) for other functionalities without departing from the invention.

The clients (150) utilizing the computing resources of the data nodes (100A, 100B) may base their selections for which data nodes to use on, for example, the PZG (102, 104) associated with the data nodes (100A, 100B). For example, a client may select to only utilize data nodes if the data nodes are in the same PZG. Conversely, the client may prefer to not utilize a data node if the data node is associated with a second PZG. The clients (150) may make selections for which data nodes to utilize via other selection metrics without departing from the invention.

In one or more embodiments of the invention, each client (152, 154) is implemented as a computing device (see, e.g., FIG. 5). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (152, 154) described throughout this application.

A client (152, 154) may be implemented as a logical device without departing from the invention. The logical device utilizes computing resources of any number of physical computing devices to provide the functionality of the client (152, 154) described throughout this application.

The invention is not limited to the architecture shown in FIG. 1.

Figure 2:
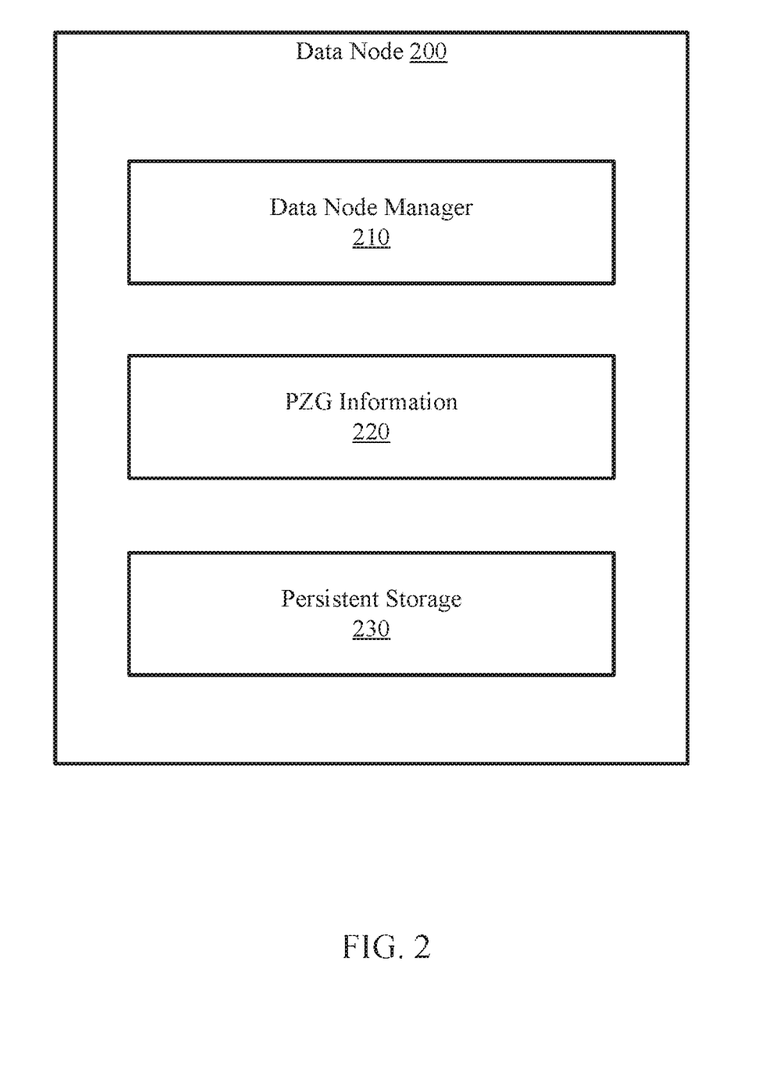
FIG. 2 shows a diagram of a data node in accordance with one or more embodiments of the invention.

FIG. 2 shows a diagram of a data node in accordance with one or more embodiments of the invention. The data node (200) may be an embodiment of a data node (100A, 100B, FIG. 1) discussed above. As discussed above, the data node (200) utilizes data node resources and, during a power failure and/or potential power failure, data node resources of other data nodes.

To perform the aforementioned functionality, the data node (200) includes a data node manager (210), PZG information (220), and persistent storage (230). The data node (200) may include additional, fewer, and/or different components without departing from the invention. Each of the aforementioned components is discussed below.

In one or more embodiments of the invention, the data node manager (210) includes functionality to communicate with other components in the system of FIG. 1. Specifically, the data node manager (210) may communicate with other data nodes in response to a power failure and/or a potential power failure. The data node manager (210) may communicate with a second data node in the system and obtain any PZG information (discussed below) of data nodes to determine whether the second data node is available to process data of the data node (200) in response to a power failure and/or a potential power failure. Further, the data node manager (210) may provide (e.g., via a broadcast, multicast, or unicast mechanism) information associated with the data node (200) to other data nodes. The information may include, for example, a geographical location, a PZG identifier of the PZG associated with the data node (200), etc. The information may be other type of information without departing from the invention.

Further, the data node manager (210) may include functionality to store, access, and/or update ledger entries in the ledger service of the system. The data node manager (210) may store ledger entries after the data node and a second data node have entered an agreement for the data node (200) to process the data in accordance with a data processing request of the second data node.

In one or more embodiments of the invention, data node manager (210) is a hardware device including circuitry. The data node manager (210) may be, for example, a digital signal processor, a field programmable gate array, or an application specific integrated circuit. The data node manager (210) may be other types of hardware devices without departing from the invention.

In one or more embodiments of the invention, the data node manager (210) is implemented as computing code stored on a persistent storage (e.g., 230) that when executed by a processor of the data node (200) performs the functionality of the data node manager (210). The processor may be a hardware processor including circuitry such as, for example, a central processing unit or a microcontroller. The processor may be other types of hardware devices for processing digital information without departing from the invention.

In one or more embodiments of the invention, the PZG information (220) includes information regarding the PZG of the data node (200). For example, the PZG information may specify an identifier of the PZG associated with the data node (200), a type of primary power source associated with the PZG (e.g., whether it is a power outlet, a battery, etc.). The PZG information (220) may further specify a status of the power source (e.g., a battery level, a time left before power to the data node is lost, etc.). The PZG information (220) may specify other information without departing from the invention.

In one or more embodiments of the invention, the PZG information (220) is stored in memory (not shown) of the data node (200). In such manner, the PZG information (220) may be quickly accessed and/or read from the data node (200) based on, for example, a data processing request (discussed below in FIG. 3A) obtained from a second data node.

In one or more embodiments of the invention, the PZG information (220) may specify additional information about the data node (200) that may be used during a power failure and/or a potential power failure.

In one or more embodiments of the invention, at least of the PZG information (220) is obtained from the secondary sources (e.g., 122, FIG. 1). The secondary source may obtain the information from other data nodes. Alternatively, the portion of PZG information associated with other data nodes may be obtained directly from the corresponding data nodes. For example, the data node (200) may send an identifier of the PZG associated with the data node (200) to a second data node. The second data node may store the PZG identifier in its PZG information.

In one or more embodiments of the invention, the PZG information is organized in any organizational structure readable to the data node (200) without departing from the invention.

In one or more embodiments of the invention, the persistent storage stores data. The data may be stored persistently. The data may be data generated by the data node (200), by a client, and/or by other data nodes. The data stored in the persistent storage (230) may be obtained from other data nodes during, for example, a data transfer between the data nodes. The data may be data utilized by one or more clients (150.

Examples of "persistent storage" (230) include, but are not limited to, certain integrated circuit storage devices (e.g., solid-state drive (SSD), Non-Volatile Memory Express (NVMe) etc.), magnetic storage (e.g., hard disk drive (HDD), floppy disk, tape, diskette, etc.), or optical media (e.g., compact disc (CD), digital versatile disc (DVD), etc.)

The invention may be implemented using other data node resources without departing from the invention.

Figure 3A:
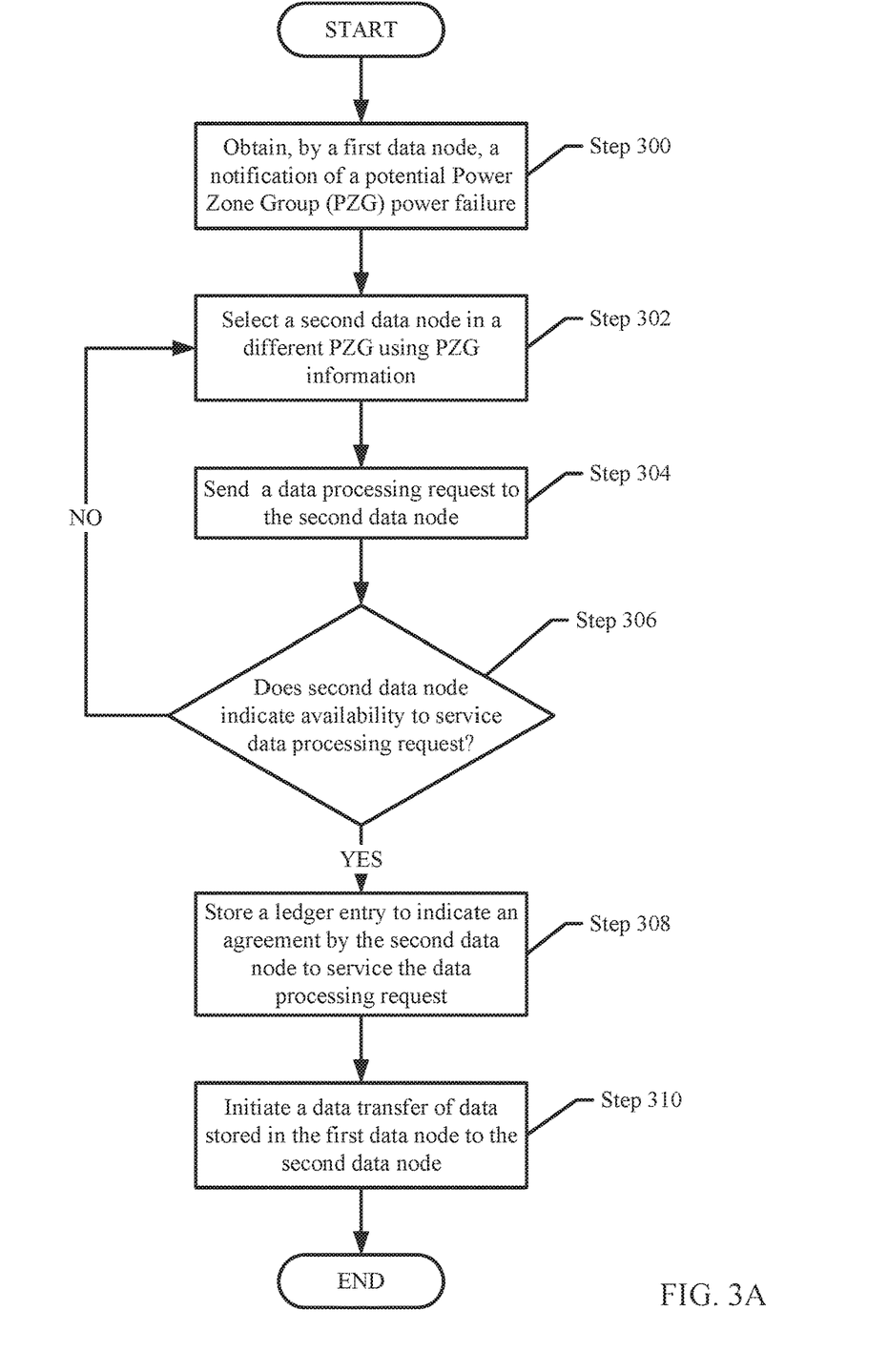
FIG. 3A shows a flowchart for responding to a power zone group (PZG) power failure in accordance with one or more embodiments of the invention.
Figure 3B:
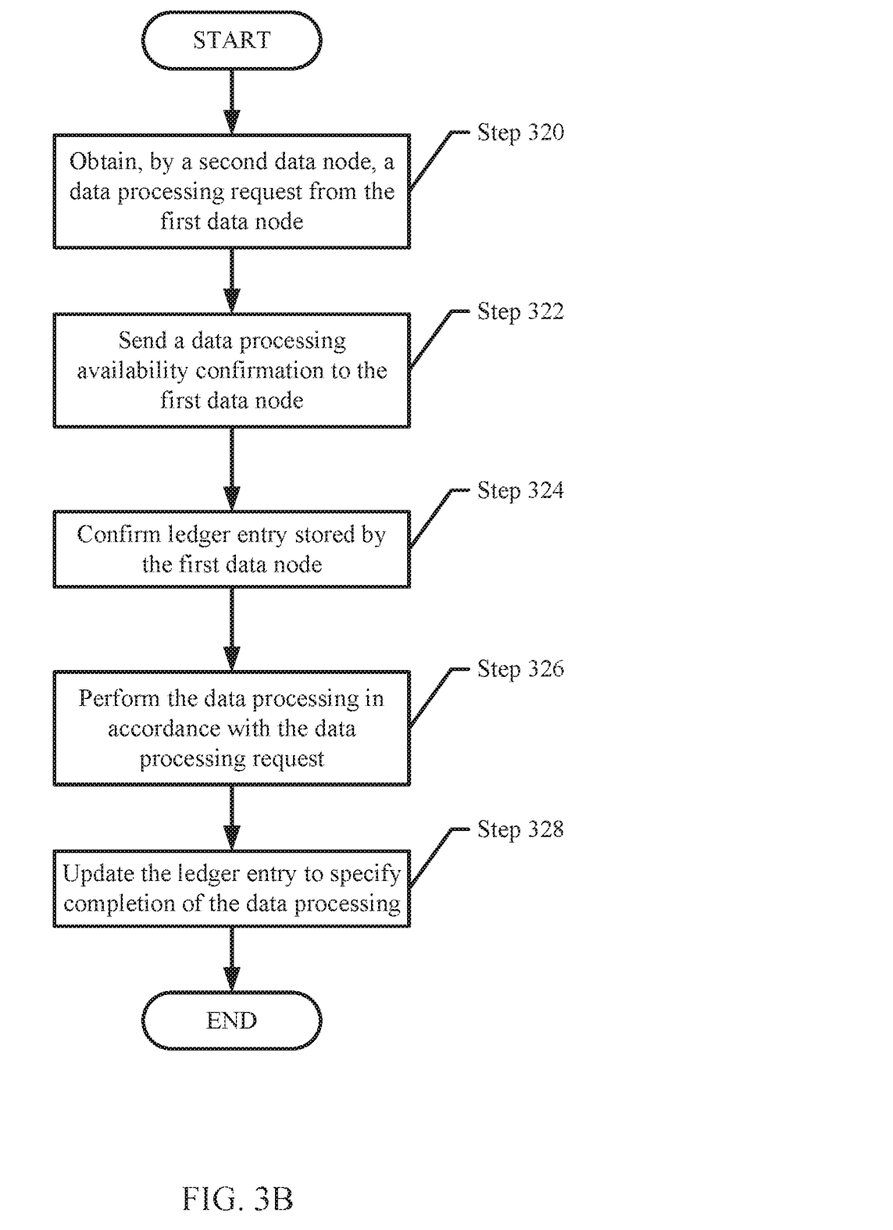
FIG. 3B shows a flowchart for servicing data processing requests in accordance with one or more embodiments of the invention.

FIGS. 3A-3B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3B may be performed in parallel with any other steps shown in FIGS. 3A-3B without departing from the scope of the invention.

FIG. 3A shows a flowchart for responding to a PZG power failure in accordance with one or more embodiments of the invention. The method shown in FIG. 3A may be performed by, for example, a data node manager (210, FIG. 2). Other components of the system illustrated in FIG. 1 or FIG. 2 may perform the method of FIG. 3A without departing from the invention.

Turning to FIG. 3A, in step 300, a notification of a potential PZG power failure is obtained. In one or more embodiments of the invention, the notification is obtained by monitoring the connection between the data node and a primary power source. The notification may be, for example, monitoring a level of power in the power node. If the power level monitored by the data node decreases significantly (e.g., more than 50% power level).

In one or more embodiments of the invention, the notification is based on the monitored power level reaching a power threshold (e.g., below 20% of power capacity). This may indicate a potential power failure may occur in the future. As such, the power data node may initiate the method of FIG. 3A in response to the monitored power level falling below the power threshold. In another embodiment, the notification may be issued when a determination is made that the primary power source may lose power after a specified period of time has elapsed (e.g., power will be lost within 30 minutes). For example, consider a scenario in which the primary power source is an AC power source with a 30-minute battery backup. If the AC power source fails, then the primary power source will initiate utilization of the 30-minute battery backup. This initiation will trigger the generation of a notification of a potential power failure.

In step 302, a second data node is selected in a different PZG using PZG information. In one or more embodiments of the invention, the PZG information specifies the PZG associated with other data nodes in the system. The data node may analyze the PZG information to identify a second data node that is associated with a PZG that is different from the PZG of the first data node. The first data node may further select the second data node based on an availability of the data nodes specified in the PZG information, a geographical location of the data nodes, and/or via any other metric specified in the PZG information without departing from the invention.

In step 304, a data processing request is sent to the second data node. In one or more embodiments of the invention, the data processing request specifies storing data in the second data node. The data processing request may serve the purpose of avoiding data loss and/or access to the data in the first data node after power is completely lost to the first data node. The data processing request may specify, for example, the size of the data, the type of data to be stored, and/or any encryption information associated with the data. The data processing request may specify any other relevant information that may enable the second data node to store the data and/or that may enable the first data node to re-obtain the data after power is re-established to the first data node.

In one or more embodiments of the invention, the data processing request further specifies a process to be performed on the data. For example, the first data node may execute a series of processing tasks on the data prior to obtaining the notification of step 300. After the notification is obtained, the first data node may recognize that it is unable to complete the series of processing tasks due to the limited power. The first data node may specify, in the data processing request, completing the series of processing tasks on the second data node.

In step 306, a determination is made about whether the second data node indicates availability to service the data processing request. The determination may be based on a response of the second data node. The response may specify a data processing availability of the second data node (e.g., whether the second data node is available for servicing the data processing request).

If the second data node indicates availability to service the data processing request, the method proceeds to step 308; otherwise, the method proceeds to step 302.

In step 308, a ledger entry is stored that indicates an agreement by the second data node to service the data processing request. In one or more embodiments of the invention, the ledger entry is stored using known or later discovered mechanisms for storing entries in a distributed ledger. The mechanisms may include, but are not limited to, encrypted blocks that can be accessed and/or modified using cryptographic signatures and/or private keys.

In one or more embodiments of the invention, the ledger entry specifies the agreement of the second data node to store and/or process the data in accordance with the data processing request. The second data node may later confirm the completion of the processing.

In step 310, a data transfer is initiated. In one or more embodiments of the invention, the first data node sends the data specified in the data processing request to the second data node. The second data node may perform the method of FIG. 3B to service the data processing request and confirm, using the ledger service, that the data processing request was serviced. In this manner, when the first data node resumes normal operations, the first data node may access the ledger service to determine whether the data processing request was serviced. Further, a client that wants to access the data that was stored on the first data node may use to ledger service to determine that a copy of the data is stored on the second data node. Based on this determination, the client may access the data from the second data node.

FIG. 3B shows a flowchart for servicing data processing requests in accordance with one or more embodiments of the invention. The method shown in FIG. 3B may be performed by, for example, a data node (100A, 100B, FIG. 1). The data node may be the second data node referenced in FIG. 3A. Other components of the system illustrated in FIG. 1 may perform the method of FIG. 3B without departing from the invention.

In step 320, a data processing request is obtained from the first data node of FIG. 3A.

In step 322, a data processing availability confirmation is sent to the first data node. In one or more embodiments of the invention, the second data node performs an analysis on the data processing request to determine whether the second data node is available for servicing the data processing request. The analysis may include, for example, identifying a size of the data to be stored and determining whether the second data node has enough storage capacity to store the data.

In step 324, a ledger entry stored in the ledger service by the first data node is confirmed. In one or more embodiments of the invention, the ledger entry is the ledger entry generated in step 308 of FIG. 3A. In one or more embodiments of the invention, the ledger entry is confirmed by storing a second entry in the ledger service that is linked (e.g., in a block chain) that specifies the data processing availability confirmation of the second node. In other words, the ledger entry of step 308 and the second ledger entry may collectively specify an agreement between the first data node and the second data node that the second data node would service the data processing request.

In step 326, the data processing is performed in accordance with the data processing request. In one or more embodiments of the invention, the data processing request is serviced after obtaining the data from the data transfer from the first data node to the second data node. As discussed above, the data processing request may specify storing the data and/or processing the data. The second data node may perform the specified task (or series of tasks) specified in the data processing request.

In step 328, the ledger entry is updated to specify completion of the data processing. In one or more embodiments of the invention, the ledger entry is further updated to specify sending a third ledger entry to the ledger service that specifies completion of the data processing. The third ledger entry may be linked (e.g., in the aforementioned block chain) to the first and the second ledger entries discussed above.

EXAMPLE

Figure 4A:
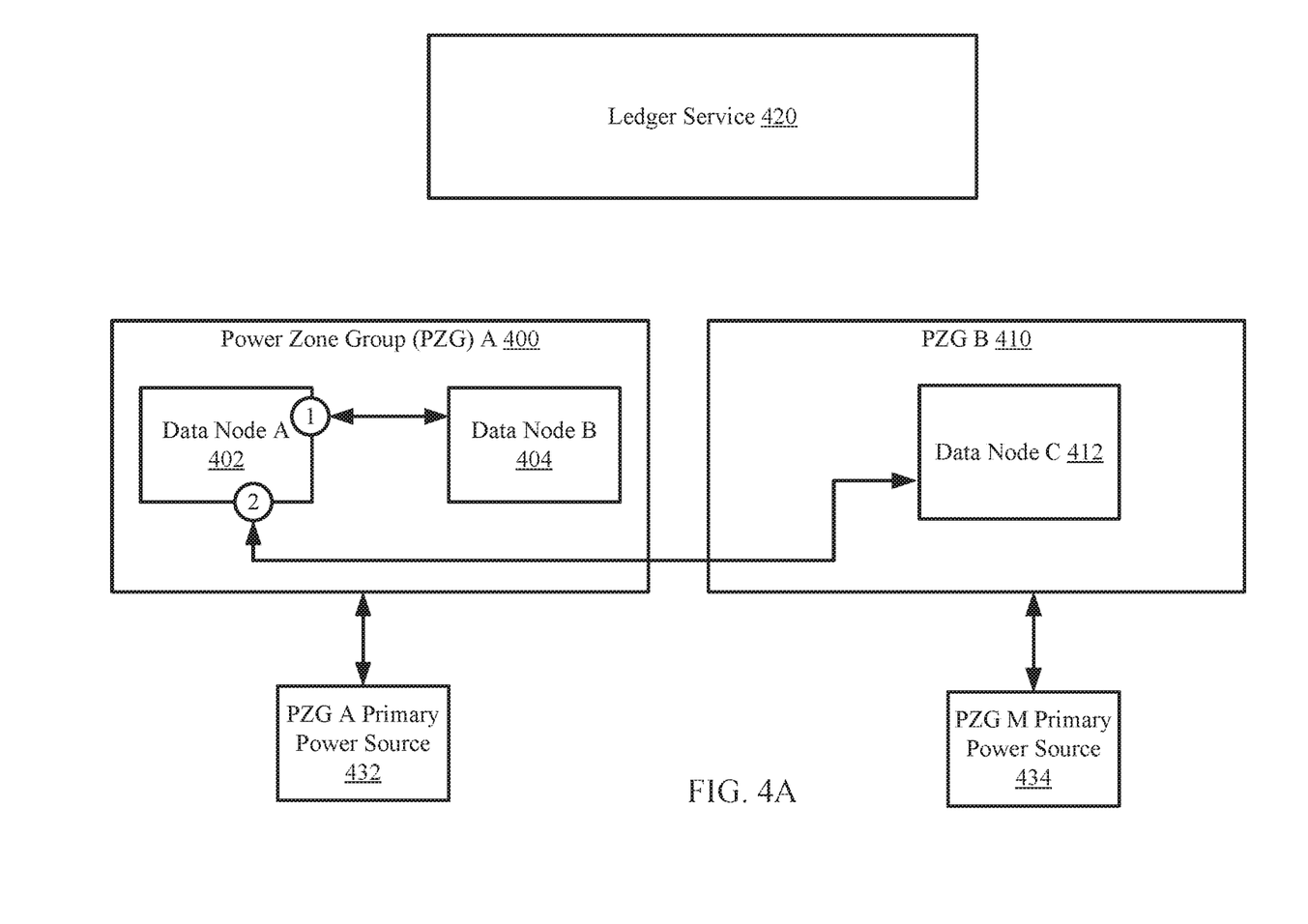
FIGS. 4A-4B show an example in accordance with one or more embodiments of the invention.
Figure 4B:
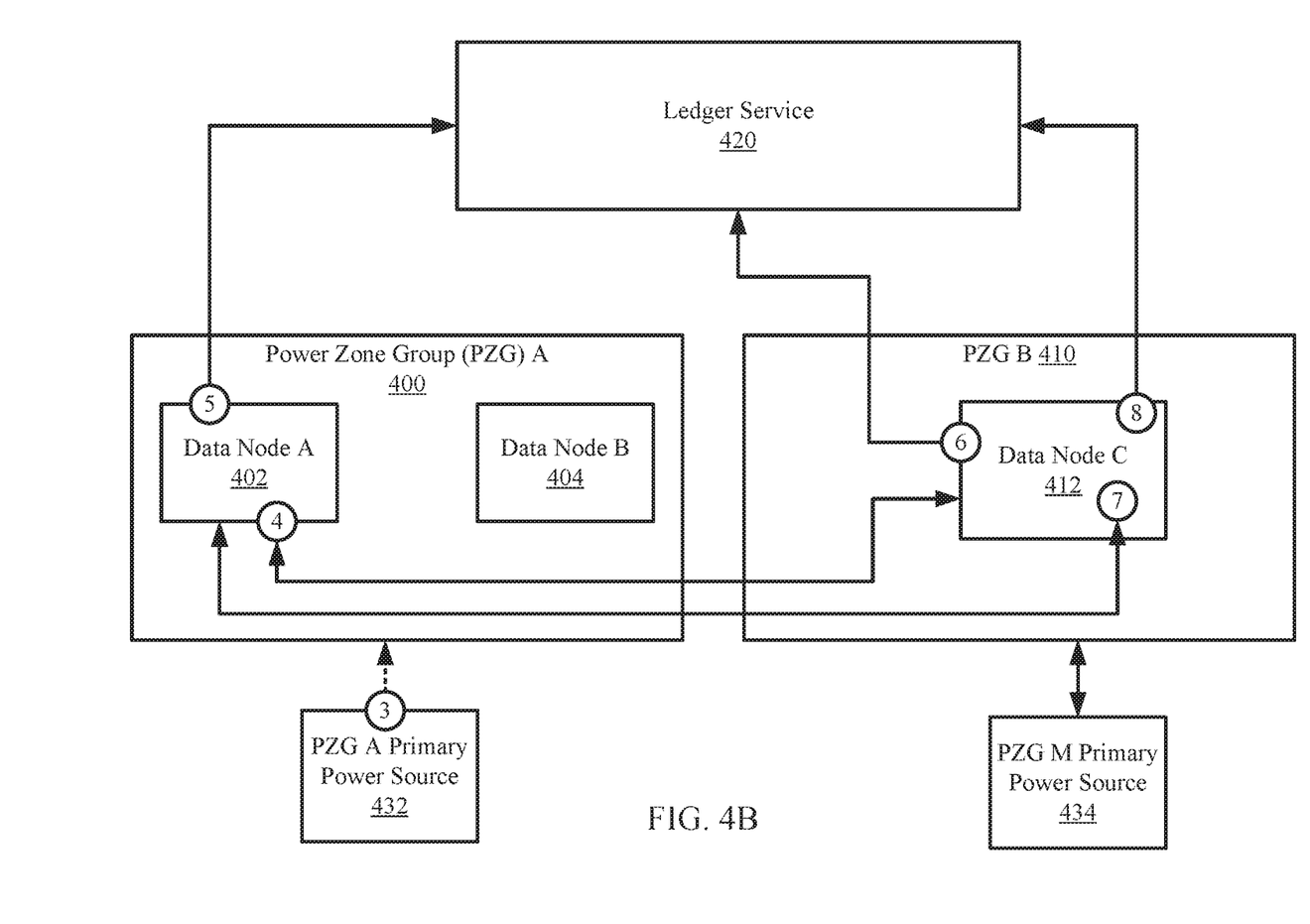

The following section describes an example. The example, illustrated in FIGS. 4A-4B, is not intended to limit the invention and is independent from any other examples discussed in this application. Turning to the example, consider a scenario in which a data node would like to access and utilize external data node resources.

FIG. 4A shows an example system in accordance with one or more embodiments of the invention. For the sake of brevity, not all components of the example system may be illustrated. The example system includes a ledger service (420), three data nodes (402, 404, 412) grouped into two PZGs (400, 410), and primary power sources (432, 434) that each power the data nodes (402, 404, 412). The PZGs (400, 410) are grouped based on the primary power sources (432, 434).

At [1], data node A (402) in PZG A (400) communicates with data node B (404) in the same PZG (400). Specifically, data node A (402) obtains information about data node B (404) such as the PZG of data node B (404) and the geographical location of data node B (404). In this example, data nodes A, B, and C (402, 404, 412) are in the same geographical location.

At [2], data node A (402) obtains similar information about data node C (412). Specifically, data node A (402) obtains an identifier of the PZG of data node C (412) and the geographic location information of data node C (412).

FIG. 4B shows the example system of FIG. 4A. At this point in time, data node A (402) includes PZG information associated with data nodes B (404) and C (412).

At [3], the primary power source (432) of PZG A (400) determines that PZG A primary power source (432) is going to lose power)

At [4], in response to the determination, the Data Node A uses the PZG information to select a data node that is: i) not associated with PZG A (400) and ii) available to store the data of data node A (402). Data node A (402) selects data node C (412). Data node A (402) communicates with data node C (412) by sending a data processing request that specifies data node C (412) storing data for data node A (402). Data node A (402) receives a response (i.e., a data processing availability confirmation) from data node C (412) that specifies that data node C (412) can service the data processing request.

At [5], data node A (402) stores a ledger entry in the ledger service (420) that specifies the agreement by data node C (420) to service the data processing request. The ledger entry is an immutable that cannot be deleted.

At [6], data node C (412) stores a second ledger entry that confirms the agreement specified in the first ledger entry.

At [7], a data transfer is initiated from data node A (402) to data node C (412). The data is to be stored in data node C (412) in accordance with the data processing request.

At [8], data node C (412) stores a third ledger entry in the ledger service (420) that specifies completion of the data transfer and further specifies that the data is stored in data node C (412).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506).

Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention reduce data loss caused by power loss to data nodes storing data. The data loss is reduces by enabling the data nodes to identify other data nodes that do not rely on the same primary power sources and utilizing a third-party service that tracks agreements between the two data nodes.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method performed by a first data node comprising:
   obtaining, by the first data node, a notification for a potential failure of a first physical primary power source, wherein the first data node is associated with a first power zone group (PZG) which comprises of a first group of data nodes that are powered by the first primary power source; and
   in response to the notification:
     selecting, based on PZG information associated with the first PZG, a second data node,
       wherein the second data node is not powered by the first physical primary power source,
       wherein the PZG information specifies a second PZG and that the second data node is one of a second group of data nodes associated with the second PZG, and
       wherein the PZG information is used to determine that the second group of data nodes is not powered by the first physical primary power source;
     sending, based on the PZG information, a data processing request to the second data node, wherein the data processing request is based on data stored on the first data node, wherein the data processing request specifies transferring data to the second data node to be processed by the second data node;
     obtaining a response based on the data processing request, wherein the response specifies a confirmation by the second data node to service the data processing request;
     storing a ledger entry in a ledger service that indicates the confirmation; and
     initiating a data transfer from the first data node to the second data node based on the data processing request.

2. The method of claim 1, wherein the data processing request specifies storing the data in the second data node.

3. The method of claim 1,
   wherein the first data node stores the PZG information, and
   wherein the PZG information specifies that the second data node is not associated with the first PZG.

4. The method of claim 3, wherein the PZG information further specifies a location of the second data node.

5. The method of claim 3, wherein the PZG information is obtained from the second data node prior to obtaining the notification.

6. The method of claim 3, wherein the PZG information is obtained from a secondary source.

7. The method of claim 1, wherein the ledger entry is updated by the second data node to specify successful servicing of the data processing request.

8. A non-transitory computer readable medium comprising computer readable program code, which when executed by a computer processor enables the computer processor to perform a method, the method comprising:
   obtaining, by a first data node, a notification for a potential failure of a first physical primary power source, wherein the first data node is associated with a first power zone group (PZG) which comprises of a first group of data nodes that are powered by the first primary power source; and
   in response to the notification:
     selecting, by the first data node, based on PZG information associated with the first PZG, a second data node, wherein the PZG information specifies a second PZG and that the second data node is one of a second group of data nodes associated with the second PZG, and wherein the second group of data nodes is not powered by the first physical primary power source;
     sending, by the first data node, based on the PZG information, a data processing request to the second data node, wherein the data processing request is based on data stored on the first data node, wherein the data processing request specifies transferring data to the second data node to be processed by the second data node,
     obtaining, by the first data node, a response based on the data processing request, wherein the response specifies a confirmation by the second data node to service the data processing request;
     storing, by the first data node, a ledger entry in a ledger service that indicates the confirmation; and
     initiating, by the first data node, a data transfer from the first data node to the second data node based on the data processing request.

9. The non-transitory computer readable medium of claim 8, wherein the data processing request specifies storing the data in the second data node.

10. The non-transitory computer readable medium of claim 8,
    wherein the first data node stores the PZG information, and
    wherein the PZG information specifies that the second data node is not associated with the first PZG.

11. The non-transitory computer readable medium of claim 10, wherein the PZG information further specifies a location of the second data node.

12. The non-transitory computer readable medium of claim 10, wherein the PZG information is obtained from the second data node prior to obtaining the notification.

13. The non-transitory computer readable medium of claim 10, wherein the PZG information is obtained from a secondary source.

14. The non-transitory computer readable medium of claim 8, wherein the ledger entry is updated by the second data node to specify successful servicing of the data processing request.

15. A system comprising:
a first data node;
a second data node; and
a ledger service,
wherein the first data node is programmed to:
obtain a notification for a potential failure of a first physical primary power source, wherein the first data node is associated with a first power zone group (PZG) which comprises of a first group of data nodes that are powered by the first primary power source; and
in response to the notification:
- select, based on PZG information associated with the first PZG, a second data node, wherein the second data node is not powered by the first physical primary power source, wherein the PZG information specifies a second PZG and that the second data node is one of a second group of data nodes associated with the second PZG, and
  wherein the PZG information is used to determine that the second group of data nodes is not powered by the first physical primary power source;
- send, based on the PZG information, a data processing request to the second data node, wherein the data processing request is based on data stored on the first data node, wherein the data processing request specifies transferring data to the second data node to be processed by the second data node,
- obtain a response based on the data processing request, wherein the response specifies a confirmation by the second data node to service the data processing request;
- store a ledger entry in the ledger service that indicates the confirmation; and
- initiate a data transfer from the first data node to the second data node based on the data processing request.

16. The system of claim 15, wherein the data processing request specifies storing the data in the second data node.

17. The system of claim 15,
wherein the first data node stores the PZG information, and
wherein the PZG information specifies that the second data node is not associated with the first PZG.

18. The system of claim 17, wherein the PZG information farther specifies a location of the second data node.

19. The system of claim 17, wherein the PZG information is obtained from the second data node prior to obtaining the notification.

20. The system of claim 17, wherein the PZG information is obtained from a secondary source.

* * * * *